United States Patent
Matsumoto et al.

(10) Patent No.: US 8,842,506 B1
(45) Date of Patent: Sep. 23, 2014

(54) HEAT-ASSISTED MAGNETIC RECORDING (HAMR) DISK DRIVE WITH FLY-HEIGHT SENSING

(71) Applicant: HGST Netherlands B.V., Amsterdam (NL)

(72) Inventors: Takuya Matsumoto, Sunnyvale, CA (US); Shen Ren, Union City, CA (US); Erhard Schreck, San Jose, CA (US); Matteo Staffaroni, Pleasanton, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/011,430

(22) Filed: Aug. 27, 2013

(51) Int. Cl.
  *G11B 11/00* (2006.01)
(52) U.S. Cl.
  USPC .............. 369/13.33; 369/13.13; 369/112.27
(58) Field of Classification Search
  USPC .......... 369/13.33, 13.13, 13.32, 13.24, 13.14, 369/13.03, 13.02, 13.12, 13.22, 13.01, 369/112.27; 360/59, 125.74; 29/603.07; 438/110
  See application file for complete search history.

(56) References Cited

U.S. PATENT DOCUMENTS 7,768,657 B2    8/2010  Jin et al.
8,593,914 B2 *  11/2013 Wang et al. ................ 369/13.33

OTHER PUBLICATIONS

Marcatili, "Dielectric Rectangular Waveguide and Directional Coupler for Integrated Optics", The Bell System Technical Journal, Sep. 1969.

\* cited by examiner

*Primary Examiner* — Ali Neyzari
(74) *Attorney, Agent, or Firm* — Thomas R. Berthold

(57) ABSTRACT

A heat-assisted magnetic recording (HAMR) disk drive with a primary waveguide that directs laser light from a laser diode to a near-field transducer includes a second waveguide for sensing the head-disk spacing or fly-height. The second waveguide has a sensor portion that senses the spacing and directs light representative of the spacing to the second waveguide's output end. The second waveguide may include a second or reference portion that is connected to the sensor portion and directs light representative of light input from the laser diode. The combined light from the two portions is directed to the second waveguide's output end. A detector, which may be a photo-diode, is located at the second waveguide's output end and provides a signal that may be coupled to a thermal fly-height controller to increase or decrease the fly-height.

17 Claims, 7 Drawing Sheets

HEAT-ASSISTED MAGNETIC RECORDING (HAMR) DISK DRIVE WITH FLY-HEIGHT SENSING

TECHNICAL FIELD

This invention relates generally to a heat-assisted magnetic recording (HAMR) disk drive, in which data are written while the magnetic recording layer on the disk is at an elevated temperature, and more specifically to a HAMR disk drive with thermal fly-height control (TFC).

BACKGROUND OF THE INVENTION

In conventional magnetic recording, thermal instabilities of the stored magnetization in the recording media can cause loss of recorded data. To avoid this, media with high magnetocrystalline anisotropy ($K_u$) are required. However, increasing $K_u$ also increases the coercivity of the media, which can exceed the write field capability of the write head. It is known that the coercivity of the magnetic material of the recording layer on the disk is temperature dependent. Thus one proposed solution to the thermal stability problem is heat-assisted magnetic recording (HAMR). In HAMR systems, high-$K_u$ magnetic recording material is heated locally during exposure to the magnetic field from the write head to lower the coercivity enough for writing to occur, but the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a near-field transducer (NFT) for heating the recording material on the disk. A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the air-bearing surface (ABS) of the air-bearing slider that also supports the read/write head and rides or "flies" above the disk surface.

HAMR disk drives with thermal fly-height control (TFC) of the read/write head have also been proposed. The slider has a disk-facing air-bearing surface (ABS) that causes the slider to ride on a cushion or bearing of air generated by rotation of the disk. The separation or spacing between the head and the disk surface is called the fly-height. The slider is attached to a suspension and the suspension includes a load beam that applies a load force to the slider to counteract the air-bearing force while permitting the slider to "pitch" and "roll". The flying dynamics of the slider and thus the fly-height are influenced by factors such as the rotation speed of the disk, the aerodynamic shape of the slider's ABS, the load force applied to the slider by the suspension, and the pitch and roll torques applied to the slider by the suspension. HAMR disk drives may use TFC for changing the spacing between the head and the disk surface. One type of TFC uses an electrically-resistive heater located on the slider near the head. When current is applied to the heater, the heater expands and causes the head to expand and thus move closer to the disk surface. The head can be adjusted to different heights, depending on whether the drive is reading or writing. Also, the heater can maintain the head at the optimal fly-height even in the presence of the above-described factors which would otherwise cause changes in the fly-height.

It is desirable to be able to accurately measure and thus control the actual fly-height, especially during write operations, which can greatly improve the recording performance and reliability. Currently, the only method for in-drive fly-height measurement is by use of the read head to calculate the well-known Wallace spacing loss from the readback signal. However, the read head is typically located several microns away from the write head on the slider, so this method does not accurately measure the fly-height of the write head. The lack of an accurate fly-height measurement is becoming more troublesome as the fly-height becomes reduced to well below 10 nm in future disk drives.

What is needed is a HAMR disk drive with in-drive fly-height measurement.

SUMMARY OF THE INVENTION

Embodiments of the invention relate to a system for sensing the fly-height in a HAMR disk drive that has a primary waveguide that directs laser light from a laser diode to the NFT. A second waveguide is located on the slider. In one embodiment the second waveguide has a sensor portion with an end that faces the ABS and is optically coupled to the primary waveguide for receiving light reflected from the disk. In a second embodiment the second waveguide has, in addition to the sensor portion, a second portion with an end that faces away from the disk and is optically coupled to the primary waveguide for receiving laser light from the laser diode. The second portion and the sensor portions are connected and direct light to the second waveguide's output end.

In a third embodiment the second waveguide has an input end for receiving laser light and a sensor portion that is oriented generally parallel to the ABS. In a fourth embodiment the second waveguide has, in addition to the sensor portion parallel to the ABS, a reference portion that receives laser light. The sensor and reference portions are connected and direct light to the second waveguide's output end.

A detector is located at the second waveguide's output end and provides a signal representative of the spacing between the ABS and the disk. In the second and fourth embodiments the detector includes circuitry for detecting the amplitude difference, which is related to the phase difference, of the optical waves coming from the two waveguide portions. The detector, which may be a photo-diode, provides an output signal that may be coupled to the TFC controller to increase or decrease the fly-height. Alternatively or in addition, the detector may be coupled to the hard disk controller, which generates a write-inhibit signal to prevent writing if the detected fly-height is less than or greater than pre-determined threshold values.

For a fuller understanding of the nature and advantages of the present invention, reference should be made to the following detailed description taken together with the accompanying figures.

DETAILED DESCRIPTION OF THE INVENTION

Figure 1:
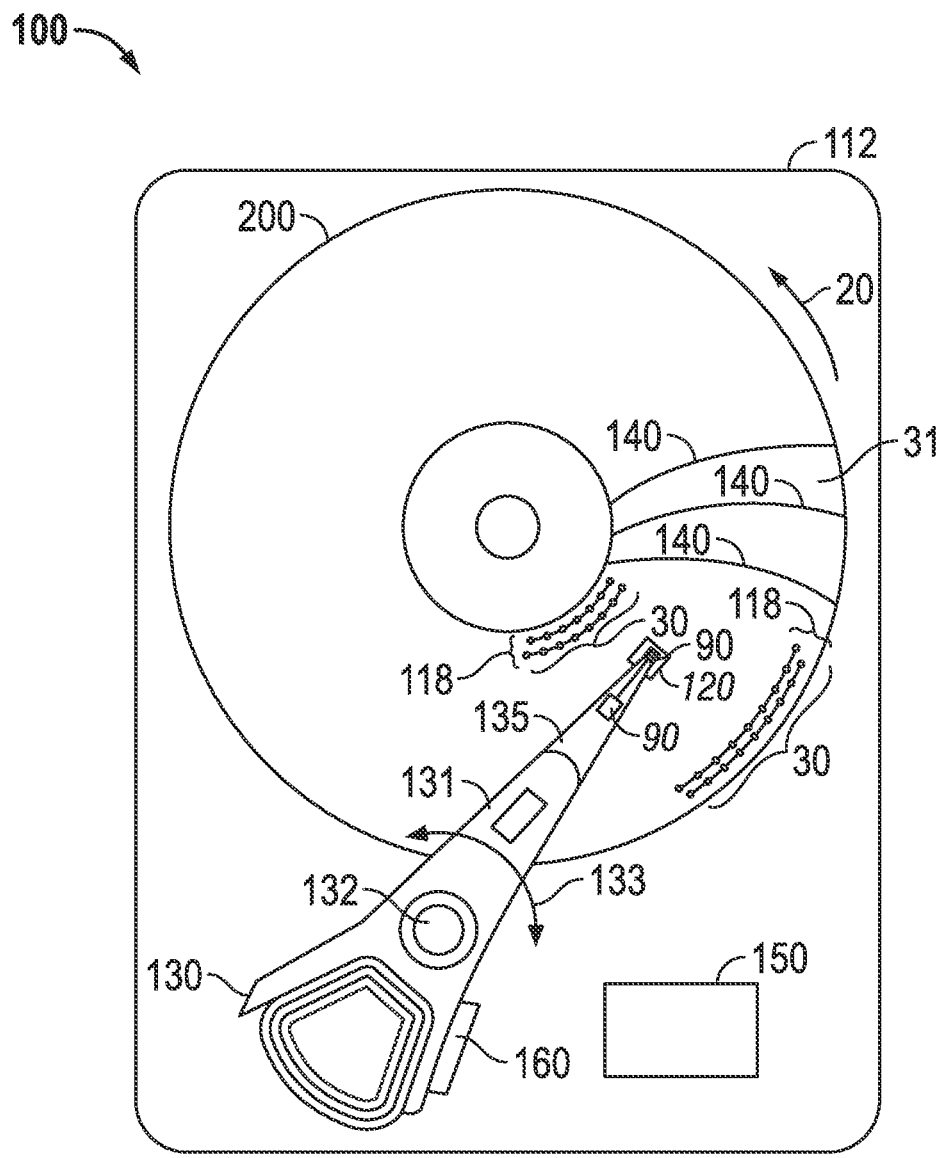
FIG. 1 is a top view of a heat-assisted recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with magnetic the recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the HAMR disk drive may instead use disks in which the recording layer 31 is a conventional continuous magnetic recording layer of magnetizable material. The disk 200 contains a plurality of servo sectors, three of which are shown as servo sectors 140, which are equally angularly spaced around the disk and extend across the tracks 118 in a generally radial direction.

The drive 100 has a housing or base 112 that supports an actuator 130 and a drive motor for rotating the magnetic recording disk 200. The drive 100 also includes the hard disk controller (HDC) 150 and an arm electronics (AE) module 160 mounted to the actuator 130. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the HAMR head (not shown), which includes a magnetoresistive read head, an inductive write head, the near-field transducer (NFT) and optical waveguide, and the thermal fly-height control (TFC) heater. A laser diode 90 with a wavelength of 780 to 980 nm may used as the HAMR light source and is depicted as being supported on the top of slider 120. Alternatively the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The servo sectors 140 contain nondata information for positioning the HAMR head to selected data tracks 118 and maintaining the head on the data tracks during reading and writing. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
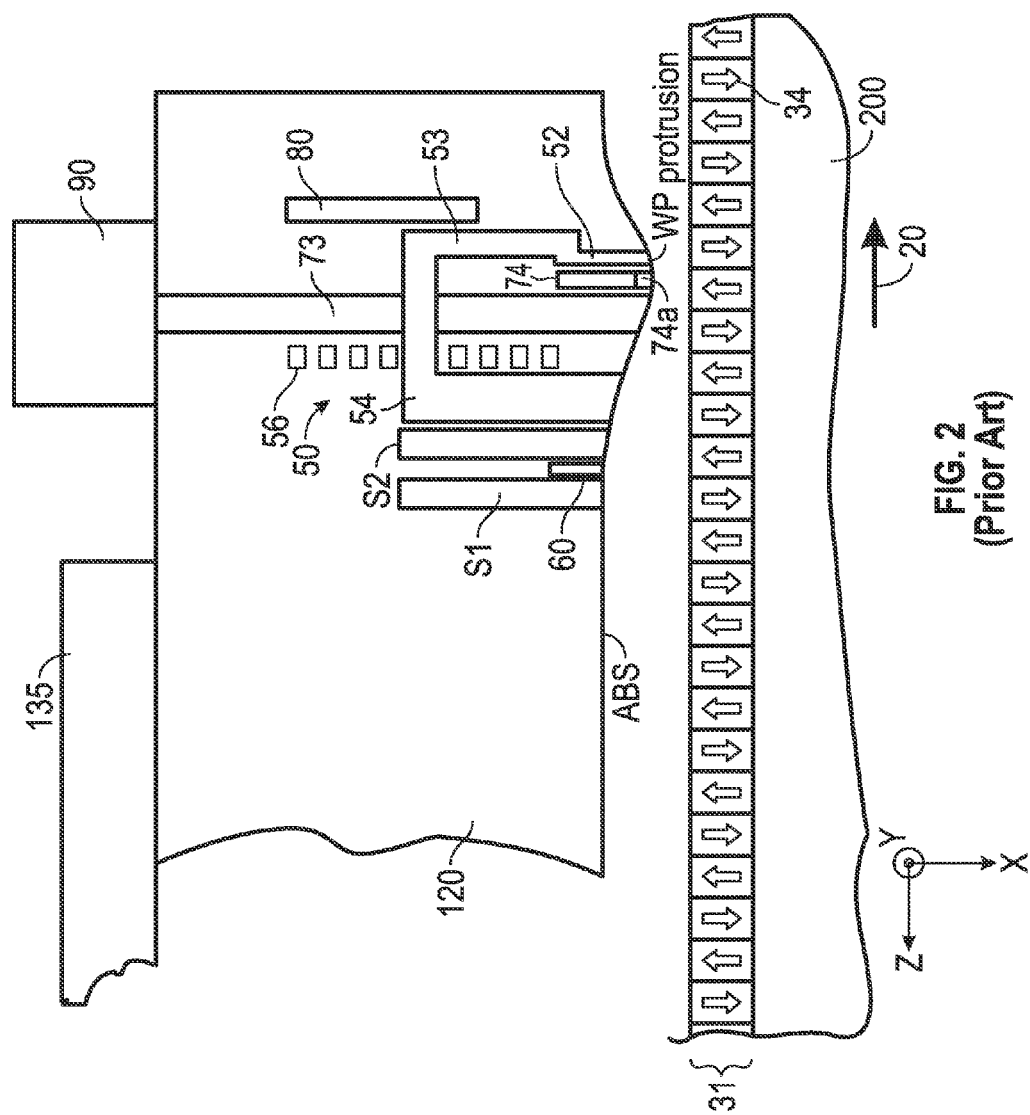
FIG. 2 is a sectional view, not to scale because of the difficulty in showing the very small features, of an air-bearing slider for use in HAMR disk drive with thermal fly-height control (TFC) and a portion of a HAMR disk according to the prior art.
Figure 3:
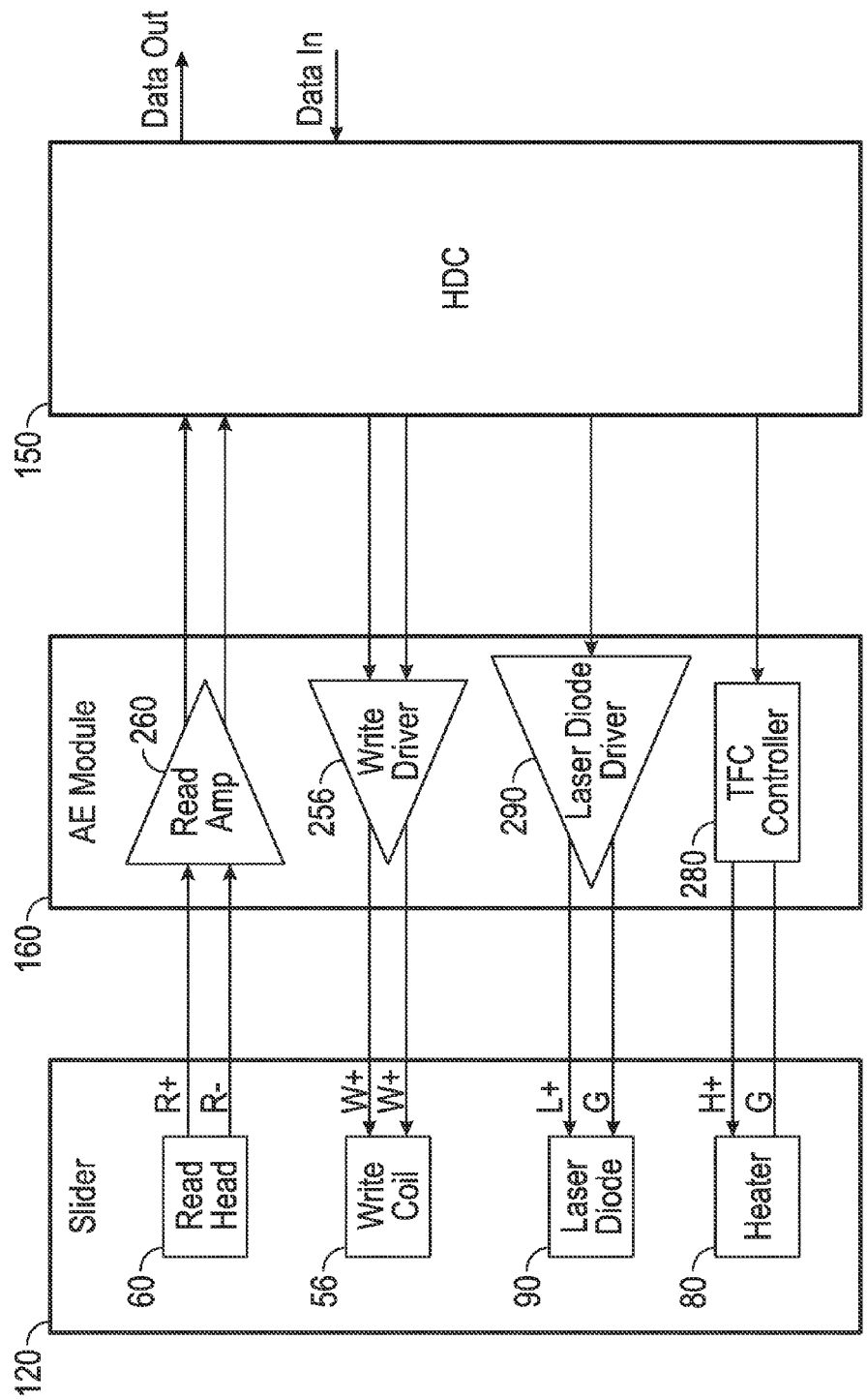
FIG. 3 is a high level block diagram showing the electrical connection between the slider, the arm electronics (AE) module and the hard disk controller (HDC) for a HAMR disk drive with TFC.

FIG. 2 is a cross-sectional view illustrating a configuration example of a HAMR head according to the present invention. FIG. 2 is not to scale because of the difficulty in showing the very small features. In FIG. 2, the X direction denotes a direction perpendicular to the air-bearing surface (ABS) of the slider, the Y direction denotes a track width or cross-track direction, and the Z direction denotes an along-the-track direction. In FIG. 3, the disk 200 is depicted with the recording layer 31 being a conventional continuous magnetic recording layer of magnetizable material with magnetized regions or "bits" 34. The air-bearing slider 120 is supported by suspension 135 and has an ABS that faces the disk 200 and supports the magnetic write head 50, read head 60 with magnetically permeable read head shields S1 and S2, and the near-field transducer (NFT) 74. A magnetic field is generated by the write head 50 made up of a coil 56, a magnetic pole 53 for transmitting flux generated by the coil 56, a write pole 52, and a return pole 54. The magnetic field generated by the coil 56 is transmitted through the magnetic pole 53 to the write pole 52, which is located near the NFT 74. At the moment of writing, the recording layer 31 of disk 200 is heated by an optical near-field generated by the NFT 74 and, at the same time, a region or "bit" 34 is magnetized and thus written onto the recording layer 31 by applying a magnetic field generated by the write pole 52. As shown in FIG. 2, the read head 60 is located some distance, typically at least 5 microns, in the along-the-track direction (the Z direction) from the write pole 52.

A semiconductor laser diode 90 is mounted to the top surface of slider 120. An optical waveguide 73 for guiding light from laser diode 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide. The NFT 74 is depicted as a metallic layer adjacent to the waveguide 73 and with a tip 74a at the ABS. The metallic layer may be evanescently coupled to or in contact with the waveguide 73. Alternatively, the NFT 74 may be located between the ABS and the output end face of the waveguide 73.

An electrically resistive heater 80 is located on slider 120 for controlling the spacing between the write pole 52 and the recording layer 31. As the current to heater 80 increases, the heater 80 expands and causes protrusion of the write pole 52, as well as the read head 60, which moves the write pole 52 and read head 60 closer to recording layer 31 on disk 200. A thermal fly-height actuator is described in U.S. Pat. No. 5,991,113 and U.S. Pat. No. 7,095,587 B2. U.S. Pat. No.

7,023,647 B2 describes a thermal fly-height control circuit that may be implemented into the disk drive's read head pre-amplifier circuit. A disk drive with TFC that adjusts the fly-height depending on the radial location on the disk where data is to be read or written is described in U.S. Pat. No. 7,375,914 B1, which is assigned to the same assignee as this application.

FIG. 3 is a high-level block diagram showing the electrical connection between the slider 120, the AE module 160 and the HDC 150. The connections between slider 120 and AE module 160 are via an integrated lead suspension (ILS) (not shown) along the actuator arm 131 and suspension 135 and include R+/R− connections between the read head 60 and the read amplifier 260, W+/W− connections between the write coil 56 and the write driver 256, a heater (H+) and ground (G) connections between the heater 80 and TFC driver 280, and a (L+) and ground (G) connections between the laser diode 90 and laser diode driver 290. During operation of the disk drive, the HDC 150 sends read and write commands to AE module 160 to read or write data in the data tracks. The TFC controller 280 adjusts the power to the heater 80 depending on the radial location on the disk 200 where data is to be read or written, and thus includes registers which store sets of heater power values to be used during reading and writing. When the HDC 150 sends write commands to AE module 160, the TFC controller 280 registers are updated so that the correct heater power values are used and correctly timed with the writing of data.

In this invention a second waveguide is located on the slider for sensing the head-disk spacing. The second waveguide may be formed of the same materials as described above for the primary waveguide that directs the laser light to the NFT. The second waveguide is connected to a detector whose output signal may be coupled to the TFC controller to increase or decrease the fly-height. Alternatively or in addition, the detector may be coupled to the HDC, which generates a write-inhibit signal to prevent writing if the detected fly-height is less than or greater than pre-determined threshold values.

Figure 4A:
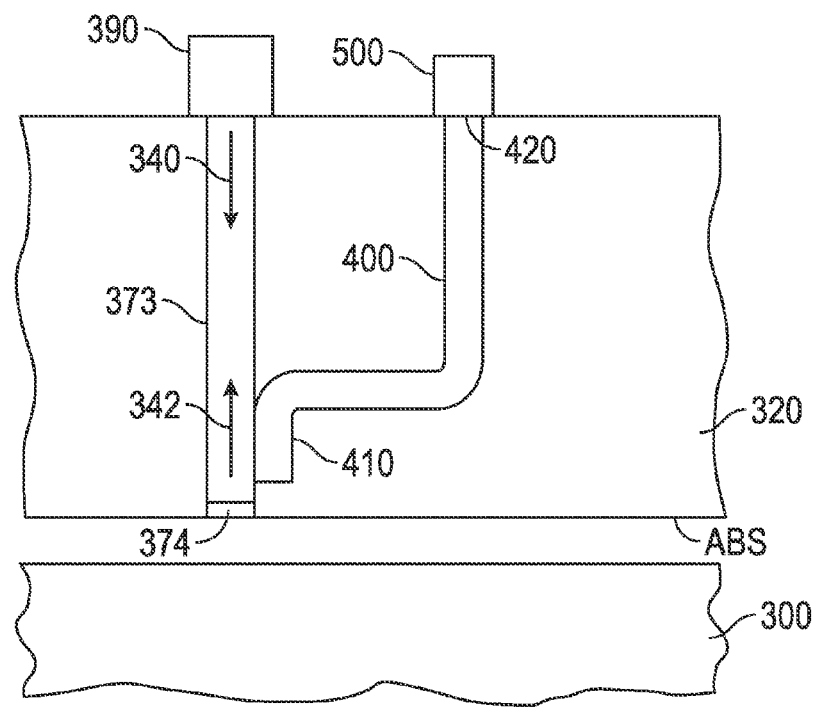
FIG. 4A is a sectional view of a slider according to a first embodiment of the invention.

FIG. 4A is a sectional view of a slider according to a first embodiment of the invention. The slider 320 is located with its ABS facing disk 300. The slider 320 supports the primary waveguide 373, which has an input end for receipt of laser light from laser diode 390 and directs the laser light in direction 340 to an output end coupled to NFT 374. A second waveguide 400 for sensing reflected light in direction 342 from disk 300 has a portion 410 oriented generally parallel to and optically coupled to primary waveguide 373 390. The second waveguide 400 functions as a well-known directional optical coupler, as described for example, by E. A. J. Marcatili, "Dielectric Rectangular Waveguide and Directional Coupler for Integrated Optics", THE BELL SYSTEM TECHNICAL JOURNAL, September 1969. The optical coupling coefficient depends on the spacing between the primary waveguide 373 and the portion 410 of the second waveguide 400. As the fly-height varies, the reflected light back into waveguide 373 varies. This reflected light is optically coupled to the portion 410 of the second waveguide 400. The second waveguide 400 has its output end 420 coupled to a detector 500, which may be a photodiode or other type of photodetector. Thus the optical power of the reflected light at the detector 500 is related to the spacing between the ABS and the disk 300. If a photodiode is the detector it provides an output current generally linearly related to the input optical power.

Figure 4B:
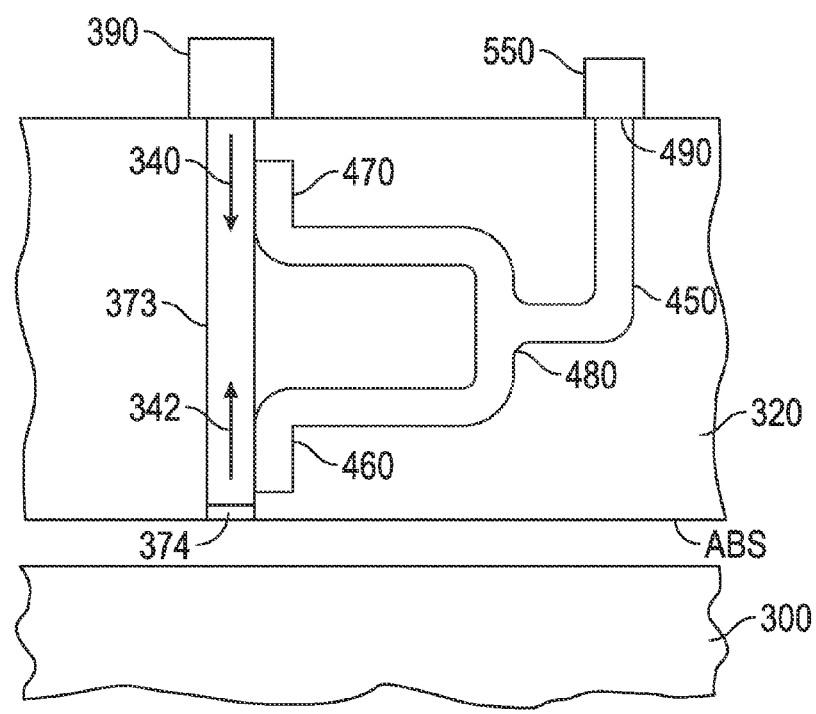
FIG. 4B is a sectional view of a slider according to a second embodiment of the invention.

FIG. 4B is a sectional view of a slider according to a second embodiment of the invention. The second waveguide 450 has a portion 460, like portion 410 of waveguide 400 in FIG. 4A, but also a portion 470 oriented generally parallel to and optically coupled to primary waveguide 373 for sensing laser light from laser diode 390 in direction 340 toward the ABS. The second waveguide 450 has its output end 490 coupled to a detector 550, which may be a photodiode. The second waveguide portions 460, 470 are connected at junction 480. They act as directional optical couplers to primary waveguide 373. In this embodiment, the coherent optical waves from portions 460, 470 merge into a combined wave at junction 480. The combined wave carries both the phase difference and amplitude difference of the two optical waves. Due to the coherent nature of the interference of the two waves, the electrical fields, instead of the intensities, are added together. The optical intensity is related to the intensity of the individual components through a cosine function of their phase difference according to Equation (1) below.

$$I(r) = I_1(r) + I_2(r) + 2\sqrt{I_1(r)I_2(r)} \cos[\phi_1(r) - \phi_2(r)] \quad \text{Equation (1)}$$

This phase difference can be converted to the amplitude difference, which is measurable with a photo-detector, like a photodiode.

Figure 4C:
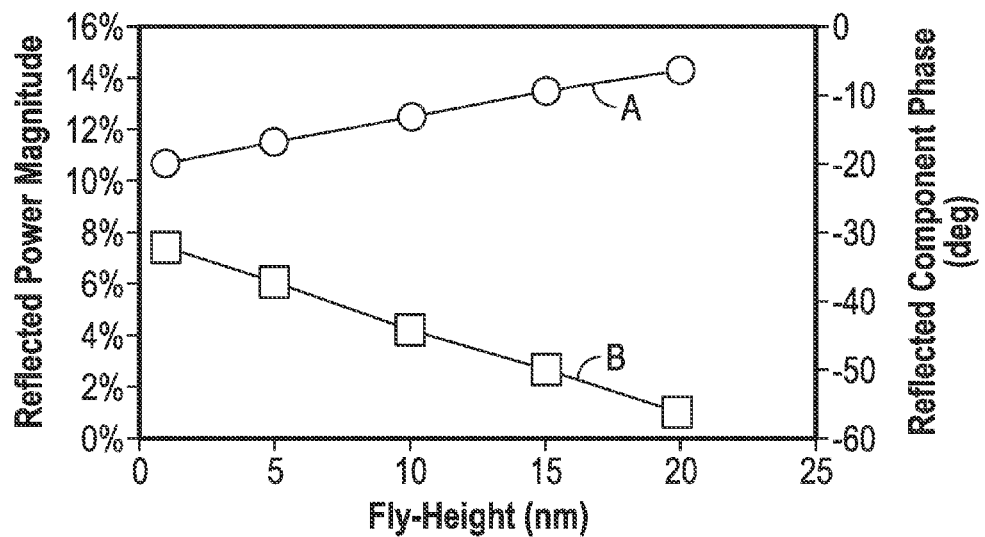
FIG. 4C is a graph showing the typical relationship between the optical power and phase of the reflected wave as a function of fly-height for the embodiments of FIGS. 4A-4B.

FIG. 4C is a graph showing the typical relationship between the optical power and phase of the reflected wave as a function of fly-height. Curve A is the reflected optical power as a percentage of the laser input power, and curve B is the phase of the reflected wave. Curve A is used to correlate the output of detector 500 of the embodiment of FIG. 4A with the fly-height. Curve B represents the phase of the wave from lower portion 460 of waveguide 450 in the embodiment of FIG. 4B. Together with the phase of the laser light wave from upper portion 470, it is used to correlate the phase difference with the fly-height.

Figure 5A:
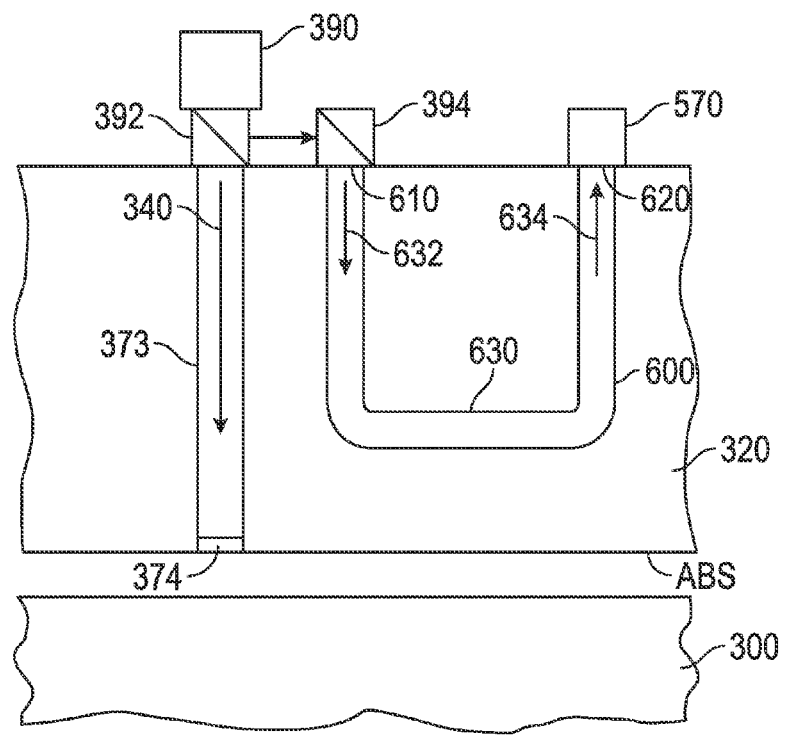
FIG. 5A is a sectional view of a slider according to a third embodiment of the invention.

FIG. 5A is a sectional view of a slider according to a third embodiment of the invention. The slider 320 is located with its ABS facing disk 300. The slider 320 supports the primary waveguide 373, which has an input end for receipt of laser light from laser diode 390 and directs the laser light in direction 340 to an output end coupled to NFT 374. The second waveguide 600 has an input end 610 that receives laser light from laser 390 through a beam splitter 392 and mirror 394, and an output end 620 coupled to detector 570. Alternatively, instead of the beam splitter and mirror, the second waveguide 600 may receive the laser light from laser diode 390 by being optically coupled to the primary waveguide 373, for example in the manner as shown by waveguide portion 470 in FIG. 4B. Also, instead of receiving light from laser diode 390, the second waveguide 600 may be coupled to a separate laser. The second waveguide 600 has a sensor portion 630 that is aligned parallel to the ABS and is located near the ABS, typically within 200 nm from the ABS. Light travels in the direction of arrow 632 to the sensor portion 630. The physical properties of the optical wave travelling inside sensor portion 630 are perturbed by the close proximity of the air gap between the ABS and the disk 300. This is because the disk 300 absorbs some portion of the evanescent wave from the sensor portion 630. Light from sensor portion 630 travels in the direction of arrow 634 to the output end 620.

Figure 5B:
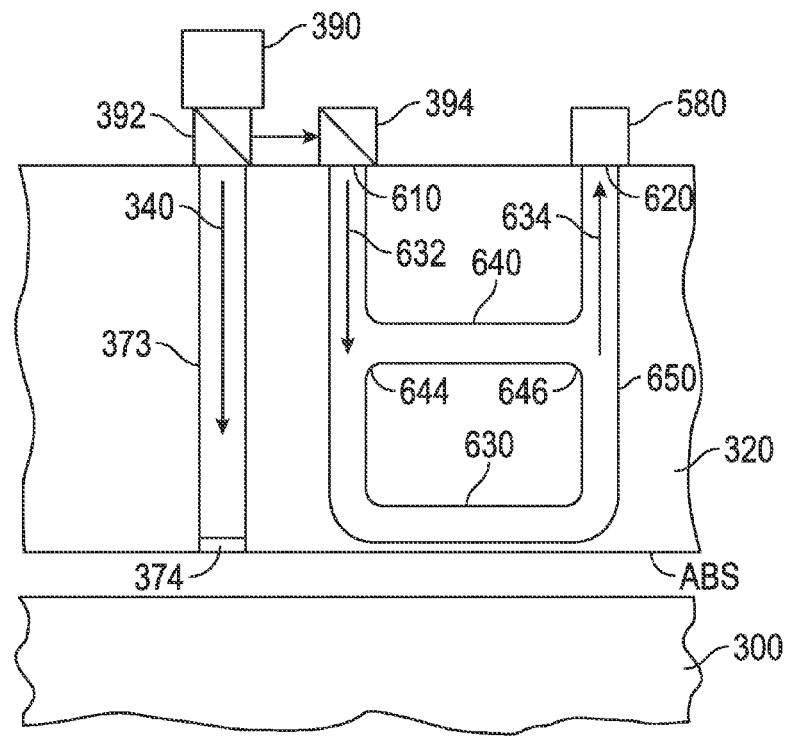
FIG. 5B is a sectional view of a slider according to a fourth embodiment of the invention.

FIG. 5B is a sectional view of a slider according to a fourth embodiment of the invention. The second waveguide 650 has a sensor portion 630 parallel to the ABS, like in FIG. 5A, but also a reference portion 640 that is spaced from the ABS far enough to not be affected by changes in fly-height. The laser light enters both the reference portion 640 and the sensor portion 630 at junction 644. The reference and sensor portions 640, 630 are connected at junction 646. In this embodiment, the coherent optical waves from portions 640, 630 merge into a combined wave at junction 646. The combined wave carries both the phase difference and amplitude difference of the two optical waves. The phase difference between the two optical waves can be converted to an amplitude difference, as explained above with Equation (1), which can be detected by detector 580, e.g., a photo-diode, and used to measure fly-height in the manner as described above for the embodiment of FIG. 4B.

Figure 5C:
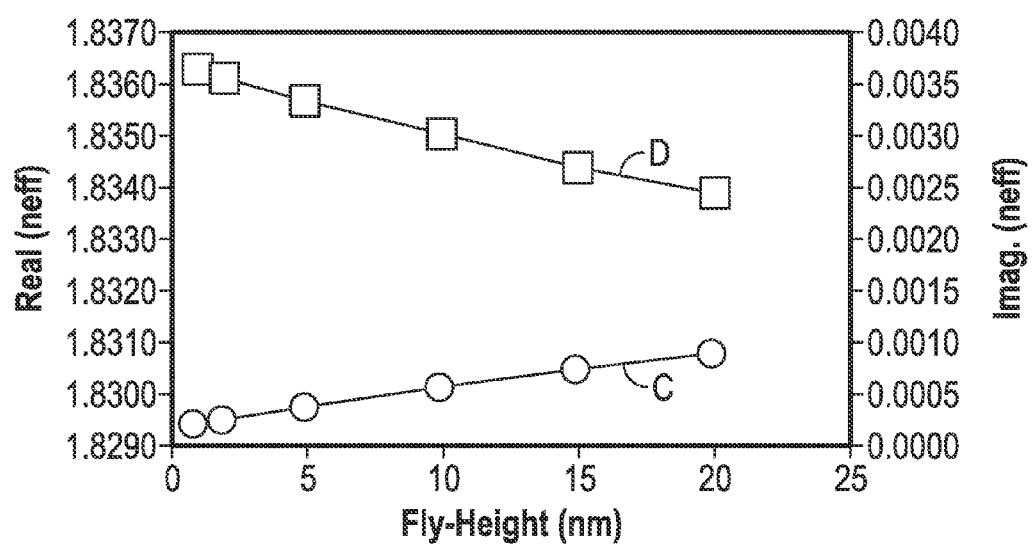
FIG. 5C is a graph showing the relationship between the real and imaginary part of the effective mode index (neff) and fly-height for the embodiments of FIGS. 5A-5B.

In the embodiments of FIGS. 5A-5B, the amplitude and phase of the optical wave varies as the fly-height varies. In particular, the spacing between the waveguide sensor portion 630 and the disk 300 alters the eigenmode distribution of the optical waveguide. FIG. 5C is a graph showing the relationship between the real and imaginary part of the effective mode index (neff) and fly-height. The variation of the real part of neff (curve C) corresponds to change of the phase of the optical wave, while the variation of the imaginary part of neff (curve D) corresponds to change in the amplitude of the optical wave. An increase in fly-height increases the real part of neff and decreases the imaginary part of neff.

Figure 6:
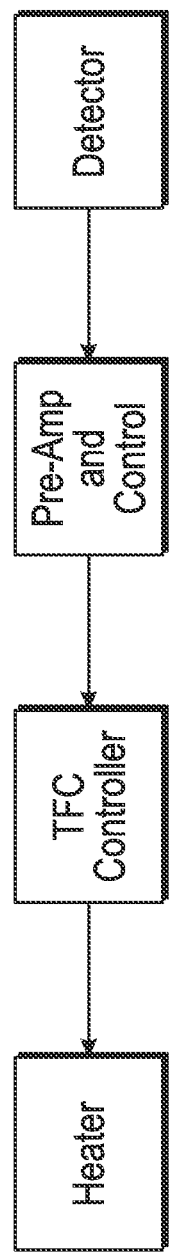
FIG. 6 is a high-level block diagram showing one way in which the embodiments of the invention may be used to modify the operation of the prior art TFC controller and heater described shown in FIG. 3.

FIG. 6 is a high-level block diagram showing one way in which the embodiments of the invention may be used to modify the operation of the prior art TFC controller and heater described above and shown in FIG. 3. The detector provides an output signal to a pre-amplifier and control circuit, the purpose of which is to amplify and filter the detector output signal. The detector may include circuitry for detecting the amplitude difference between two optical waves for the embodiments of FIGS. 4B and 5B. The output of the control circuit is input to the TFC controller, which supplies the appropriate heater power levels to the heater. Thus the fly-height can be increase or decreased in response to the detector output signal. Alternatively, the detector output signal may be digitized and input directly to the HDC, which controls the TFC controller. The HDC may also compare the detector signal to a predetermined threshold value representative of a minimum and/or maximum fly-height. If the detector signal exceeds a threshold the HDC may generate a write-inhibit signal to the write driver.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A system for detection of head-disk spacing of a heat-assisted magnetic recording (HAMR) head in a disk drive comprising:
    an air-bearing slider having an air-bearing surface (ABS) for facing the disk;
    a near-field transducer (NFT) on the slider at the ABS;
    a primary optical waveguide on the slider and optically coupled to the NFT, the primary optical waveguide having an input end for receipt of laser light;
    a second optical waveguide on the slider for sensing the spacing between the ABS and the disk, the second optical waveguide having an output end for transmitting light representative of said spacing; and
    a detector for detecting the light transmitted from the output end of the second waveguide.

2. The system of claim 1 wherein the second waveguide includes a sensor portion optically coupled to, spaced from and oriented generally parallel to the primary waveguide for receipt of light reflected from the disk and optically coupled from the primary waveguide, the sensor portion having an end facing the ABS.

3. The system of claim 1 wherein the second waveguide further comprises:
    a first portion optically coupled to, spaced from and oriented parallel to the primary waveguide for receipt of the laser light optically coupled from the primary waveguide; and
    a second portion optically coupled to, spaced from and oriented parallel to the primary waveguide for receipt of light reflected from the disk and optically coupled from the primary waveguide, said first and second portions being connected to the second waveguide's output end; and
    wherein said detector includes circuitry for detecting the amplitude difference of light from said first and second portions.

4. The system of claim 1 wherein the second waveguide has an input end for receipt of laser light and a sensor portion located at the ABS and oriented parallel to the ABS.

5. The system of claim 4 wherein the second waveguide includes a reference portion recessed from the ABS and connected to said second waveguide input end, said sensor and reference portions being connected to the second waveguide's output end; and wherein said detector includes circuitry for detecting the amplitude difference of light from said sensor and reference portions.

6. The system of claim 1 wherein the detector is located on the slider.

7. The system of claim 1 wherein the detector comprises a photo-diode.

8. The system of claim 1 further comprising a write pole on the slider at the ABS adjacent the NFT and a heater on the slider for adjusting the spacing between the write pole tip and the disk; and wherein the detector is electrically coupled to the heater.

9. The system of claim 1 further comprising a write head on the slider and a controller for controlling the writing of data to the disk by the write head; and wherein the controller is electrically coupled to and responsive to an output signal from the detector for inhibiting writing.

10. A heat-assisted magnetic recording (HAMR) disk drive comprising:
    a rotatable magnetic recording disk;
    a laser diode;
    an air-bearing slider having an air-bearing surface (ABS) facing the disk;
    a write pole on the slider at the ABS;
    a heater on the slider for adjusting the spacing between the write pole tip and the disk;
    a fly-height controller for controlling power to the heater;
    a near-field transducer (NFT) on the slider at the ABS adjacent the write pole;
    a primary optical waveguide on the slider and optically coupled to the NFT, the primary optical waveguide being oriented generally orthogonal to the ABS and having an input end for receipt of laser light from the laser diode;
    a second optical waveguide on the slider and having a sensor portion optically coupled to the primary optical waveguide for receipt of light reflected from the disk, the sensor portion having an end facing the ABS, the second optical waveguide having an output end for transmitting light representative of the spacing between the ABS and the disk; and
    a detector for detecting the light transmitted from the output end of the second waveguide.

11. The disk drive of claim 10 wherein the detector is coupled to the fly-height controller.

12. The disk drive of claim 10 further comprising a controller for controlling the writing of data to the disk by the write pole; and wherein the controller is electrically coupled to and responsive to an output signal from the detector for inhibiting writing.

13. The disk drive of claim 10 wherein the second waveguide further comprises:
   a second portion optically coupled to the primary waveguide for receipt of laser light from the laser diode, the second portion having an end facing away from the ABS, wherein said sensor portion and said second portion are connected to the second waveguide's output end; and
   wherein said detector is adapted to detect the amplitude difference of light from said sensor and second portions.

14. A heat-assisted magnetic recording (HAMR) disk drive comprising:
   a rotatable magnetic recording disk;
   a laser diode;
   an air-bearing slider having an air-bearing surface (ABS) facing the disk;
   a write pole on the slider at the ABS;
   a heater on the slider for adjusting the spacing between the write pole tip and the disk;
   a fly-height controller for controlling power to the heater;
   a near-field transducer (NFT) on the slider at the ABS adjacent the write pole;
   a primary optical waveguide on the slider and optically coupled to the NFT, the primary optical waveguide having an input end for receipt of laser light from the laser diode;
   a second optical waveguide having an input end for receipt of laser light from the laser diode and a sensor portion located at the ABS and oriented parallel to the ABS, the second optical waveguide having an output end for transmitting light representative of the spacing between the ABS and the disk; and
   a detector for detecting the light transmitted from the output end of the second waveguide.

15. The disk drive of claim 14 wherein the detector is coupled to the fly-height controller.

16. The disk drive of claim 14 further comprising a controller for controlling the writing of data to the disk by the write pole; and wherein the controller is electrically coupled to and responsive to an output signal from the detector for inhibiting writing.

17. The disk drive of claim 14 wherein the second waveguide includes a reference portion recessed from the ABS and connected to said second waveguide input end, said sensor and reference portions being connected to the second waveguide's output end; and wherein said detector is adapted to detect the amplitude difference of light from said sensor and reference portions.

* * * * *